United States Patent [19]

West

[11] 4,010,405

[45] Mar. 1, 1977

[54] ELECTROLYTIC CAPACITORS WITH PRESSURE-RELIEF AND ELECTRODE STRUCTURE RETAINING MEANS

[75] Inventor: Fred H. West, Sanford, N.C.

[73] Assignee: Cornell-Dubilier Electric Corporation, Newark, N.J.

[22] Filed: May 8, 1975

[21] Appl. No.: 575,487

[52] U.S. Cl. .............................. 361/433; 361/272; 429/53

[51] Int. Cl.² ................. H01G 9/00; H01M 2/12

[58] Field of Search ............ 317/230, 242; 136/177

[56] References Cited

UNITED STATES PATENTS

| | | | |
|---|---|---|---|
| 2,393,966 | 2/1946 | Brennan | 317/230 |
| 2,636,062 | 4/1953 | Colton | 317/230 X |
| 2,881,368 | 4/1959 | Hancock | 317/230 |
| 2,884,575 | 4/1959 | Lilienfeld et al. | 317/230 |
| 3,197,547 | 7/1965 | Peace et al. | 317/230 |

FOREIGN PATENTS OR APPLICATIONS

| | | | |
|---|---|---|---|
| 1,102,286 | 3/1961 | Germany | 317/230 |
| 499,083 | 1/1939 | United Kingdom | 317/230 |

*Primary Examiner*—Andrew J. James

[57] ABSTRACT

The disclosed electrolytic capacitors have an end-seal and a terminal at an end of a case containing an electrolytic capacitor section. The case has an inward projecting formation for obstructing a means inward of the end seal acting as a barrier for preventing expulsion of the capacitor section in the event of an internal pressure rise great enough to blow the end-seal out of its sealing position.

9 Claims, 1 Drawing Figure

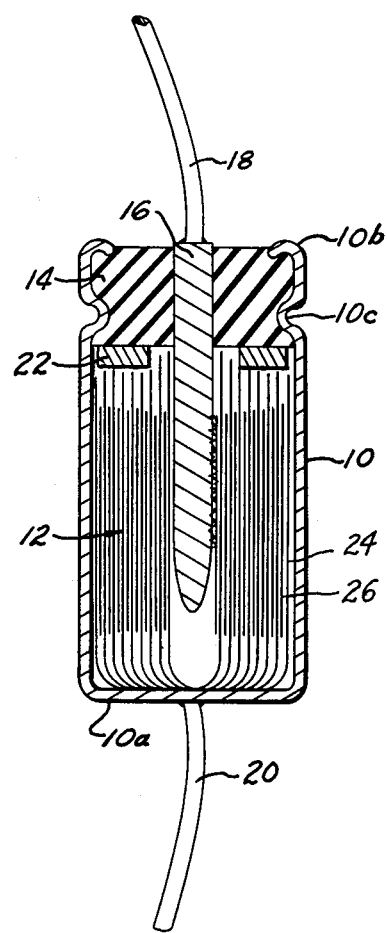

ELECTROLYTIC CAPACITORS WITH PRESSURE-RELIEF AND ELECTRODE STRUCTURE RETAINING MEANS

FIELD OF THE INVENTION

This invention relates to electrolytic capacitors, especially "miniature" capacitors having pressure-relief means.

BACKGROUND OF THE INVENTION

Over the years many pressure-relief structures have been incorporated in the design of hermetically sealed electrolytic capacitors, often taking the form of valves. The can is sealed to preserve the electrolyte against drying out or leaking. Explosive pressure can thus develop inside the can due to malfunction or misapplication. Pressure-relief structures devised for large capacitors have been found impractical for incorporation into capacitors having small-size cans, e.g. about ½-inch diameter and less. In the absence of a distinct pressure-relief device, it has been known that the entire end-seal structure would be released suddenly upon development of internal pressures approaching explosive levels and even at much lower pressures, representing a safety hazard. The entire capacitor electrode assembly might then be projected violently and dangerously from the can.

As one solution to this problem for special application to small-diameter cans, it has been proposed that a weakening incision in the end or the side wall of the can would provide safe pressure-relief. That approach, while effective, has required the exercise of great care in achieving precisely the right amount of penetration of the incision into the wall of the can. Despite care in making the incisions, the pressure level at which venting occurs is variable. If the incision is too deep, the can vents too readily and the capacitor fails prematurely. If the incision is not deep enough, the pressure may well blow out the end seal before the incision function. The incision cannot be tested to sort out the capacitors having the proper venting range since the test is destructive. Moreover, the incision represents a weak point that could develop into a leak. The incision can also be breached accidentally in handling, as by a fingernail, particularly where the incision is made on the outside surface of the can.

SUMMARY OF THE INVENTION

The present invention recognizes as non-hazardous a shift of the whole end-seal that forms a closure of the case to a cocked position or to be wholly expelled provided that the electrode assembly is blocked against expulsion when seal-bursting internal pressure develops. An inward projecting formation of the case obstructs a means in the case that blocks expulsion of the electrode assembly that is ordinarily soft enough to pass through such case formation. The invention applied especially to small-diameter electrolytic capacitors, and particularly to the type having a resilient plug that forms the hermetic closure or end-seal. In the exemplary embodiment, the barrier means is a separate element interposed between the end-seal and the electrode assembly. The barrier is firm enough to block the electrode assembly from being expelled powerfully when the end-seal is released by excessive internal pressure.

As a feature of specific merit applicable to the resilient plug type of end-seal, the bead formation of the can that squeezes the resilient plug is the same formation that blocks the barrier against expulsion from the can.

The nature of the invention, and its various objects and novel features, will be recognized and better appreciated from the following detailed description of an illustrative embodiment shown in the accompanying drawing.

THE DRAWINGS

In the drawings, the single FIGURE is a longitudinal cross-section of a novel electrolytic capacitor as an embodiment of the invention.

AN ILLUSTRATIVE EMBODIMENT

The following detailed description relates to an exemplary form of electrolytic capacitor. The illustrative capacitor has wound-foil electrodes and it has a cathode foil connected to an enclosing case, being a cylindrical metal can. Variations will be obvious to those skilled in the art, as in the case of capacitors wherein both electrodes are insulated from the case and have separate terminal leads and in particular, capacitors having end seals and terminals at opposite ends of the case, and where other forms of electrode assemblies are used.

The illustrative capacitor in the drawing includes a generally cylindrical can 10 as of aluminum containing a wound electrolytic capacitor section 12. The wound capacitor section here includes alternating convolutions of a cathode foil and an anode foil, separated from each other by porous separators as of paper, the wound section being impregnated with an electrolyte. In this capacitor, one end of the can is closed by end wall 10a that is an integral portion of can 10. The side and end walls are formed of a single metal part, as a deep-drawn can. The opposite end of the can is sealed by a resilient plug 14 as of butyl rubber. Riser 16 of aluminum is connected to the anode foil and extends through plug 14 to anode terminal wire 18, wire 18 being butt-welded to riser 16. The riser and the terminal wire constitute the anode terminal. Cathode terminal wire 20 is butt-welded to the exterior of end wall 10a of the can. The cathode foil 24 is wider than the anode foil 26. One edge of the cathode foil extends from the lower end of the wound section and freely and firmly contacts can 10. Both edges of the anode foil are recessed from both top and bottom edges of the cathode foil. A connecting strip of aluminum (not shown) extends from the cathode foil to the can, welded to the foil and to the can in a conventional manner and folded on itself as the electrode assembly is inserted into the can. The paper separators (not shown) between the foils, project above the upper edge of the cathode foil in one form of the device, but in a modification of the upper edge of the cathode foil projects to or higher than the upper edge of the paper separators.

Two formations 10b and 10c of the can squeeze resilient plug 14 in radial and axial directions and thereby form a seal between the can and the plug and additionally form a seal between riser 16 and plug 14. Bead 10c indents the lateral surface of plug 14. The lower or inner surface of plug 14 is supported by the assembly in the can. Pressure exerted by lip 10b on the top or outer face of plug 14 is firmly resisted by bead 10c.

The illustrative capacitor as thus far described is a well-known type of capacitor. In so-called miniature capacitors, the can has a maximum diameter (which varies with different capacitor ratings) of about ½-inch. Its length varies widely, also depending on the ratings.

Riser 16 has a smooth cylindrical surface where it passes through plug 14. Riser 16 has a diameter of 0.070 inch in an example. The outside diameter of can 10 in this example is nominally 0.375 inch, and its wall thickness is about 0.020 inch. The can is of deep-drawn aluminum. Such capacitors are made by assembling the capacitor section into the can, slipping centrally pierced plug 14 into place along wire 18 and riser 16, and sealing the capacitor by rolling-over lip 10b and forming bead 10c in spinning operations. In this example, bead 10c has a minimum external diameter of about 0.312 inch. Accordingly, the internal diameter of bead 10c is 0.272 inch as compared with the internal can diameter of about 0.335 inch. Plug 14 in this example initially has a diameter of 0.320 inch and a thickness of 0.160 inch.

The capacitor section is impregnated with an electrolyte, either before the section is inserted into the can, or after insertion but before the plug is sealed in place. The anode foil is treated to provide a so-called formed oxide, in a preparatory operation. The completed capacitor is electrically treated to reform any damaged oxide and to form all other bare areas of the anode that are exposed to the electrolyte. The electrolyte, a liquid or a gel or the like, ordinarily is a formulation containing some water and in any case it tends to boil or to evolve gas when the capacitor malfunctions and when it is misapplied. Hydrogen is commonly evolved, or both hydrogen and oxygen may be evolved in case of decomposition of water in the electrolyte. The evolution of gas is rapid when the capacitor fails in use, because the absorbed electrical energy tends to cause rapid decomposition and/or boiling of the electrolyte. Evolving gas can increase the internal pressure to the point where plug 14 or other comparable end seal in prior-art forms of electrolytic capacitors is blown free. Where oxygen and hydrogen are both developed, there may even be an internal explosion caused by an internal spark that ignites the mixture of gases yielded by electrolytically decomposed electrolyte.

Blowing of the capacitor's end seal or other form of pressure-relief device must occur under these conditions. However, damage could result from violent expulsion of capacitor section 12. For this reason, some form of pressure-relief or venting has been built into the containers of electrolytic capacitors for many years. The illustrated and presently preferred capacitor meets the problem directly and effectively by allowing the whole end seal to be displaced and thus to vent the can. The electrode assembly is blocked against expulsion. In particular, a firm or rigid barrier 22 is placed inside plug 14, having a diameter definitely too large to pass formation 10c of the can. In this example, this is the same formation that squeezes plug 14 to seal the can to the plug and to seal the plug to the riser. Barrier 22 may be a disc of aluminum having an outside diameter of 0.315 inch and thickness of 0.060 inch, and a hole of 0.150 inch diameter through which riser 16 extends. The clearance where the disc is of metal and touches—or can touch—the can or the cathode foil or both. The projecting margins of the inner convolutions of the cathode foil may extend into this clearance space; but suitable material such as the paper separators provide insulation in the space between the riser and the nearby portions of the cathode foil. In any case, the enlarged hole provides a means for unrestricted exposure of end seal 14 to the gas pressure developed at the capacitor section 12. Thus disc 22 does not seal plug 14 from the space containing the electrolyte and consequently the end-seal, especially the plug type of end-seal, is subjected to any internal pressure that may develop at the section.

In the example given above, plug 14 is squeezed and severely deformed and retained in sealing contact with the can and the riser. The plug blows open and relieves internal pressure when the pressure rises to about 500 pounds per square inch or somewhat less, in the case of can diameters of about ½-inch or less. This is far below the rupturing strength of the can. The same pressure-relief occurs where disc 22 is present. However, disc 22 serves as a secure barrier against violent expulsion of wound section 12. Riser 16 and wire 18 are united securely to the anode foil, thus being a secure part of the electrode assembly. The riser and wire are not united to plug 14 and are free of obstruction that could block plug 14 from shifting outward so as to vent the excess pressure. Otherwise such an obstruction could cause plug 14 to pull on the wound section and thus threaten forcible expulsion of the wound section. Of course, a limited enlargement of terminal 16, 18 immediately outside plug 14 can be present if it does not prevent pressure-responsive displacement of plug 14 apart from section 12. Where there is a readily rupturable conductor between the wound section and the anode terminal, the terminal could be united to the end-seal without interfering with safe pressure-relief. Barrier 22 can be made of any suitable material such as polyethylene, polypropylene, nylon and polyvinyl chloride, which are electrical insulators. A barrier of insulating material is desirable where the can is to be insulated from both electrodes. Discs of 0.090 inch and 0.100 inch thicknesses of Teflon (polytetrafluorethylene) have been used successfully as barriers in capacitors of 0.375 outside diameter as described above. Disc 22 is of metal as disclosed and claimed in a companion patent application filed herewith. A metal disc can provide the requisite strength without being very thick and thereby occupying space in the can that should better be occupied by the wound capacitor section. A disc of polyvinyl chloride having a thickness of 0.031 inch proved inadequate, while an aluminum disc of the same thickness was successful. In choosing a barrier 22 of thermo-plastic, it should be recognized that heat is usually developed when the capacitor fails, so the barrier thickness must take this into account.

Allowing the plug to escape from its sealing position does not necessarily mean that the plug leaves the can entirely, because the plug or other end seal could vent the can by becoming cocked. Where a plug forms the end seal even if the plug were to be totally expelled, it would remain captive on the terminal wire, thus being harmless. Broadly, the capacitor must be of such construction that an inward projecting formation of the can is cooperable with the contained structure inward of the end seal to prevent expulsion of the electrode assembly after release of the end seal. Thus the barrier could be part of the electrode assembly.

Barrier 22 in the above example has proved eminently successful where it was shaped as a centrally perforated disc. However, the barrier can have other shapes in capacitors having the illustrated form of end seal. At the loss of some strength, edge-notched discs or discs with plural holes can be used with the type of end plug illustrated. Where other forms of end seals are used, barrier shapes should be chosen such as to avoid impairment of the seal between the can and the end-seal, and between the riser and the end-seal.

In the form of end-seal illustrated, the plug is directly exposed, top and bottom, to lip 10b and to disc 22, respectively. Obviously, thin wafers could be interposed at these points without significant change since those wafers would function as part of the plug in responding to internal pressures, or as part of the disc.

In the described capacitor, disc 22 is cooperable with bead 10c in restraining the capacitor section against expulsion, bead 10c in this example serving dual functions. It is evident, however, that a separate formation of the can could be included (a needless complication) for arresting barrier 22. Bead 10c would then be relied on only to serve its seal-forming function.

Various other modifications will be obvious to those skilled in the art. Therefore, the invention should be construed broadly in accordance with its full spirit and scope.

I claim:

1. An electrolytic capacitor, including a cylindrical case, an electrode assembly in the case impregnated with electrolyte, a terminal extending outside the case from said electrode assembly and a resilient plug forming an end closure of the case, said case embodying sealing means for squeezing the resilient plug and for thereby enforcing sealing contact of the plug to the case and to said terminal and including at least one formation of the case about the plug, said plug and said sealing means being proportioned to release the plug bodily from its position as an end closure in response to internal pressures well below case-rupturing pressures, and barrier means separate from said plug interposed between said electrode assembly and plug and cooperable with a portion of the case for preventing expulsion of said electrode assembly from the case upon release of said plug, said capacitor incorporating a passage bypassing said barrier means for transmitting gas pressure from the electrode assembly to the internal end of the plug.

2. An electrolytic capacitor in accordance with claim 1, wherein said sealing means includes an annular bead projecting inward of the wall of the case, said bead pressing into the lateral surface of the plug.

3. An electrolytic capacitor in accordance with claim 1, wherein said sealing means embodied in the can includes a turned-in lip over an annular area at the end of the plug and an inward-extending bead bearing against and surrounding the lateral surface of the plug.

4. An electrolytic capacitor in accordance with claim 1, wherein said barrier is a rigid disc having a hole through which said terminal extends.

5. An electrolytic capacitor in accordance with claim 1, wherein said sealing means for squeezing the plug constitutes the portion of the case with which said barrier means is cooperable for preventing expulsion of the electrode assembly.

6. An electrolytic capacitor, including a case, an electrode assembly impregnated with electrolyte contained in the case, the case having an opening through which the electrode assembly could be expelled in case of excessive pressure build-up in the case, an end-seal closing said opening, and a terminal extending from an electrode of said assembly to the exterior through the end-seal, the end-seal being displaceable from its said case-closing position by excessive internal pressure, said case having an inward projecting obstruction, and means within the case inward of, separate from said end-seal and cooperable with said obstruction for barring expulsion of the electrode assembly when the end-seal is displaced.

7. An electrolytic capacitor assembly in accordance with claim 6, wherein said last-named means is a firm barrier between said electrode assembly and said inward obstruction of the case.

8. An electrolytic capacitor assembly in accordance with claim 6, wherein said last-named means is a firm barrier between said electrode assembly and said inward obstruction of the case, and wherein the shape of said barrier in relation to the rest of the capacitor affords gas pressure transmission from the interior of the case to the inner surface of the end-seal by-passing the barrier.

9. An electrolytic capacitor assembly in accordance with claim 6, wherein said terminal is firmly connected to the electrode assembly and wherein the terminal and the end-seal are free of interlocking means such as would enforce outward travel of the electrode assembly with the end-seal when the latter is expelled by excessive internal pressure.

* * * * *